UNITED STATES PATENT OFFICE.

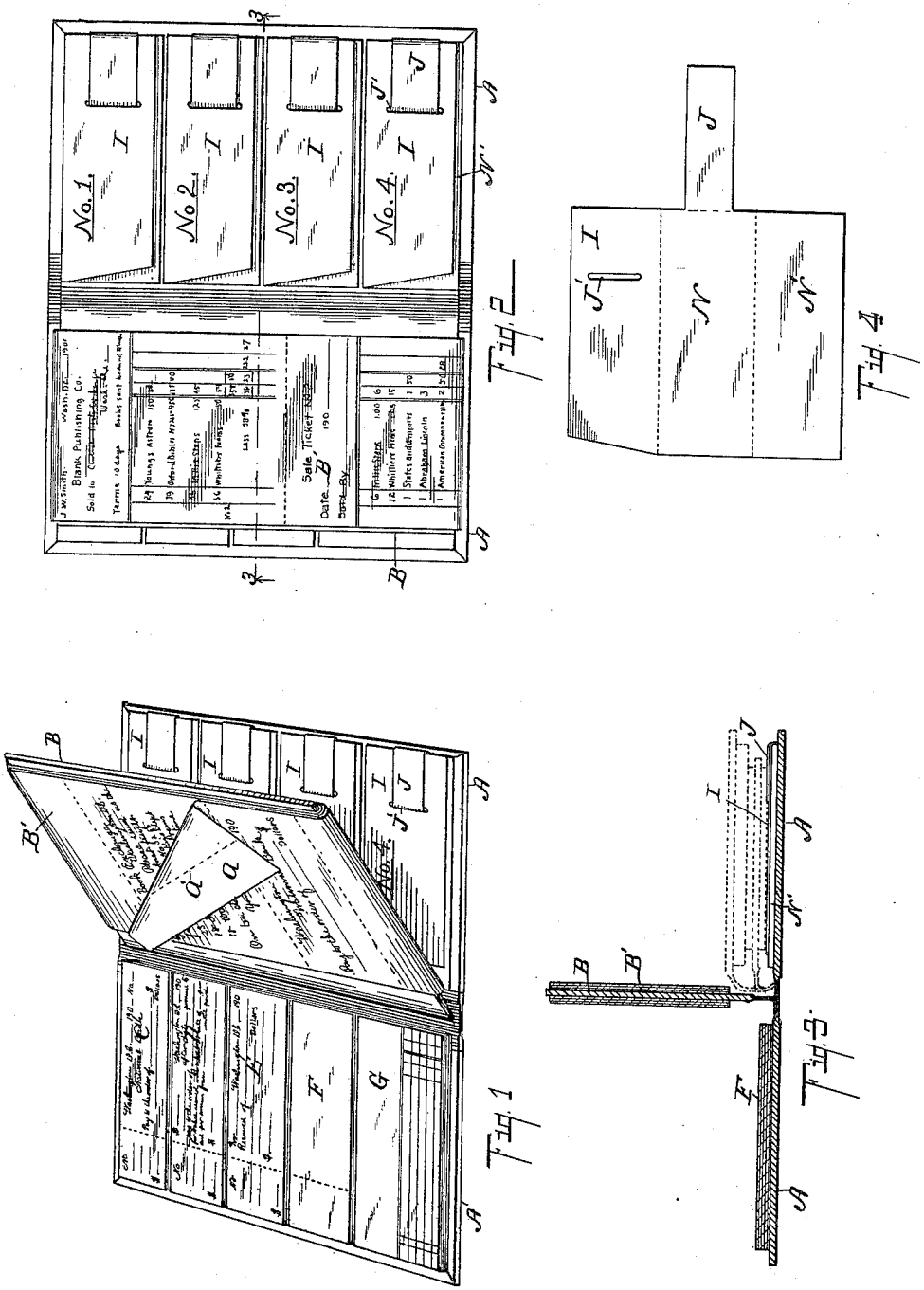

EUGENE GREGORY, OF BATTLECREEK, MICHIGAN.

DEVICE FOR TEACHING BOOKKEEPING.

SPECIFICATION forming part of Letters Patent No. 678,616, dated July 16, 1901.

Application filed February 6, 1900. Serial No. 4,174. (No model.)

*To all whom it may concern:*

Be it known that I, EUGENE GREGORY, a citizen of the United States, residing at the city of Battlecreek, in the county of Calhoun and State of Michigan, have invented a certain new and useful Device for Teaching Bookkeeping, of which the following is a specification.

This invention relates to an improved device or appliance for use in teaching bookkeeping.

In teaching bookkeeping by modern methods the pupil is taught to not only make the proper entries in the journal, day-book, ledgers, &c., but he is also instructed in attending to all the details ordinarily attended to by the bookkeeper—such as the drawing of checks and of notes, drafts, filling out invoices, statements of account, and the like, and in making the proper entries when orders are received, taking care of the bank account, and of the proper filing and caring for all papers in connection with the business. By the methods heretofore adopted boxes have been made use of for the different papers, which papers are placed in the same promiscuously, and the different books have been detached and separate, which makes it very awkward and inconvenient for the student when it is considered that very limited desk room is usually provided for each student.

One object of my invention is to provide a compact and efficient means of retaining all these papers and documents in order and in such form that the student is assisted in making correct use of them.

A further object is to provide the different devices in compact convenient form, so that the student will not be inconvenienced for desk room.

A further object is to provide a simple, compact, and convenient filing-envelop adapted to be attached to the cover of a book in this connection.

A still further object is to provide in connection with the book-cover an intermediate leaf with a web of paper therein, on which what are known as the incoming papers are printed and made easily detachable.

Further objects will definitely appear in the detailed description to follow.

I accomplish these objects of my invention by the devices and means described in this specification.

The invention is clearly defined and pointed out in the claims.

A structure embodying the features of my invention is fully illustrated in the accompanying drawings, forming a part of this specification, in which—

Figure 1 is a perspective view of my improved device with the center leaf, with its web of paper partially opened. Fig. 2 is a plan view of the structure appearing in Fig. 1 with the leaf B and its web B' closed down to the left-hand side, exposing fully to view the improved filing-pockets secured in position. Fig. 3 is a detail sectional elevation taken on line 3 3 of Fig. 2, showing the leaf B raised to the central position and the structure being indicated closed by dotted lines. Fig. 4 is a detail view of the blank forming one of my improved filing-envelops.

Referring to the lettered parts of the drawings, A is the outer cover, made, preferably, of stiff board, with a suitable flexible back.

B is the center leaf, secured by a suitable hinge, preferably a flexible strip, to the back of the cover A. On the center leaf B, I wrap a web of paper B', divided up into sections $a$, separated by dotted lines $a'$ or by suitable perforations. These sections $a$ have printed thereon the incoming papers, such as checks received, bills, notes, orders, invoices, bills of lading, and any other paper likely to be received by a merchant or person conducting business.

On the left-hand portion of the cover are attached small stub-books C D E F, which have the stubs at their left-hand side, which represent the check-book, the book of notes, the book of receipts, and any other books of which stubs are kept, which are printed in blank to be filled out by the student in carrying on the business. At the bottom, at G, I provide a small pad drawn up for invoices or for statements of account, all of which are detachable.

On the right-hand page of the cover A, I provide a series of filing envelops or holders I, which are to receive either temporarily or permanently all of the papers received or disbursed by the student. On these envelops I print appropriate instructions as to their uses. The envelops or holders are made of a blank (see Fig. 4) consisting of a central portion N, a lower portion N', suitable to fold upon the center portion N, and an upper portion adapted to fold on the center portion N, which has a transverse slit or slot J' therein. A tongue J, extending beyond the edge of the cover, is creased to fold over and insert in the slot J' to retain the parts together. These envelops are secured to the cover in such a position that when the cover is folded it closes their inner ends. This does away with one flap and enables their easy manipulation, decreases the bulk, and also saves material.

The method of operation and the objects are obvious from this description and the view in the drawings.

I desire to state in this connection that my improved bookkeeping device can be considerably varied without departing from my invention. The central leaf B, with the paper thereon, could be used in the cover in connection with other styles of envelops and holders and with a different arrangement of the stub-books than here called for, and, in fact, the device might be made use of independent from the stub-books and blanks appearing on the left-hand page, although this arrangement is very compact and satisfactory, and the folding of the parts in this way with the leaf B extending to near the outside serves to secure and retain the stubs in position after the leaves in the stub-books have been torn out.

Having thus described my invention, what I claim as new, and desire to secure by Letters Patent, is—

1. In a device for teaching bookkeeping, the combination of the cover A with a flexible back having stub-books secured to one side and envelops secured to the opposite side; a leaf B of stiff material having a web of paper wrapped thereon, containing the matter representing the incoming paper, coacting for the purpose specified.

2. In a device for teaching bookkeeping, the combination of a suitable cover; an intermediate leaf secured therein; a continuous strip or web of paper upon which are printed the incoming papers named, wrapped around said leaf; and suitable envelops secured within the cover for filing the papers in order as they are accumulated, for the purpose specified.

3. In a device for teaching bookkeeping, the combination of a suitable cover; an intermediate leaf secured therein; a continuous strip or web of paper upon which are printed the incoming papers wrapped around said leaf, as specified.

4. In a bookkeeping device, the combination with a folding cover of a holder formed with the central portion N having a tongue J on its outer end, a flap N' and an upper flap containing a slot J' to receive the said tongue J to close the outer end of said holder secured to one side of said cover with its inner end toward the back thereof, whereby said inner end will be closed when said cover is folded, as specified.

In witness whereof I have hereunto set my hand and seal in the presence of two witnesses.

EUGENE GREGORY. [L. S.]

Witnesses:
BURRITT HAMILTON,
MAUDE BARTON.